United States Patent
Ooi et al.

(10) Patent No.: US 11,829,208 B2
(45) Date of Patent: Nov. 28, 2023

(54) INFORMATION HANDLING SYSTEM DISPLAY PERIPHERAL WITH A DETACHABLE INTEGRATED CAMERA

(71) Applicant: Dell Products L.P., Round Rock, TX (US)

(72) Inventors: Ghee Beng Ooi, Singapore (SG); Surendran Ramachanthiran, Singapore (SG); Chih Hao Kao, Singapore (SG)

(73) Assignee: Dell Products L.P., Round Rock, TX (US)

( * ) Notice: Subject to any disclaimer, the term of this patent is extended or adjusted under 35 U.S.C. 154(b) by 2 days.

(21) Appl. No.: 17/700,609

(22) Filed: Mar. 22, 2022

(65) Prior Publication Data
US 2023/0305604 A1 Sep. 28, 2023

(51) Int. Cl.
*G06F 1/16* (2006.01)
*G03B 17/56* (2021.01)

(52) U.S. Cl.
CPC ......... *G06F 1/1686* (2013.01); *G03B 17/561* (2013.01); *G06F 1/1605* (2013.01); *G06F 1/1624* (2013.01); *G06F 1/1632* (2013.01); *G06F 1/1683* (2013.01)

(58) Field of Classification Search
CPC .................................................. G06F 1/1605
See application file for complete search history.

(56) References Cited

U.S. PATENT DOCUMENTS

| | | | | | |
|---|---|---|---|---|---|
| 5,144,290 | A | * | 9/1992 | Honda | G06F 1/1683 345/905 |
| 5,281,962 | A | * | 1/1994 | Vanden Heuvel | G08B 5/229 340/7.52 |
| D363,471 | S | * | 10/1995 | Shima | D14/317 |
| 5,475,441 | A | * | 12/1995 | Parulski | H04N 1/2112 348/158 |
| 5,612,733 | A | * | 3/1997 | Flohr | H04N 7/142 348/E7.079 |
| 5,734,414 | A | * | 3/1998 | Nishimura | H04N 7/142 348/14.05 |
| 5,768,163 | A | * | 6/1998 | Smith | G06F 1/1601 361/679.28 |

(Continued)

OTHER PUBLICATIONS

Dell, "Dell 27 Video Conferencing Monitor—C2723H," downloaded from https://www.dell.com/en-us/shop/dell-27-video-conferencing-monitor-c2723h/apd/210-bdm/monitors-monitor-accessories on Feb. 25, 2022, 16 pages.

*Primary Examiner* — Adrian S Wilson
(74) *Attorney, Agent, or Firm* — ZAGORIN CAVE LLP; Robert W. Holland (57) ABSTRACT

An information handling system display peripheral includes a peripheral camera in a cavity that extends out to capture visual images for communication through a cable to the display peripheral and from the display peripheral to the information handling system. The camera peripheral separates from the display peripheral with removal from the cavity and extension of the cable from a spool so that the camera peripheral can capture visual images from a variety of positions around the display peripheral, such as by resting on a support surface with feet that extend out from the camera peripheral or by coupling to a surface with an adhesive tape on a back side of the camera peripheral.

18 Claims, 7 Drawing Sheets

(56) References Cited

U.S. PATENT DOCUMENTS

| | | | | |
|---|---|---|---|---|
| 5,801,919 A * | 9/1998 | Griencewic | G06F 1/1616 | 361/679.26 |
| 5,808,672 A * | 9/1998 | Wakabayashi | H04N 23/661 | 348/E5.025 |
| 5,855,343 A * | 1/1999 | Krekelberg | F16M 13/022 | 248/126 |
| 5,880,783 A * | 3/1999 | Ma | H04N 23/55 | 348/E5.025 |
| 5,900,907 A * | 5/1999 | Malloy | H04N 7/142 | 348/E7.079 |
| 6,081,422 A * | 6/2000 | Ganthier | G06F 1/1605 | 361/679.22 |
| 6,118,653 A * | 9/2000 | Kim | G06F 1/1679 | 312/223.1 |
| 6,137,526 A * | 10/2000 | Kakii | H04N 7/144 | 396/428 |
| 6,141,052 A * | 10/2000 | Fukumitsu | G06F 1/1616 | 348/E5.025 |
| 6,175,491 B1 * | 1/2001 | Park | G06F 1/183 | 361/747 |
| 6,300,979 B1 * | 10/2001 | Parkinson | F16M 11/24 | 396/428 |
| 6,323,902 B1 * | 11/2001 | Ishikawa | G06F 1/1607 | D14/125 |
| 6,381,124 B1 * | 4/2002 | Whitcher | G06F 1/1626 | 345/905 |
| 6,406,327 B1 * | 6/2002 | Soon | H02G 11/00 | 361/679.02 |
| 6,416,239 B1 * | 7/2002 | Chou | H04N 7/142 | 396/419 |
| 6,417,884 B1 * | 7/2002 | Chang | G06F 1/1616 | 348/376 |
| 6,481,681 B1 * | 11/2002 | Stunkel | G06F 1/1601 | 248/229.11 |
| D471,578 S * | 3/2003 | Okuley | D16/242 | |
| 6,711,006 B2 * | 3/2004 | Chen | G06F 1/1601 | 361/679.55 |
| 6,812,958 B1 * | 11/2004 | Silvester | H04N 23/51 | 348/E5.026 |
| 6,903,926 B2 * | 6/2005 | Masuda | G06F 1/1607 | 361/679.05 |
| 6,933,981 B1 * | 8/2005 | Kishida | H04N 1/00251 | 348/207.1 |
| RE38,884 E * | 11/2005 | Kakii | H04N 7/144 | 396/428 |
| 6,970,202 B1 * | 11/2005 | Glogan | F16M 13/02 | 348/207.1 |
| 6,982,742 B2 * | 1/2006 | Adair | H04N 23/66 | 348/E5.026 |
| 7,002,621 B2 * | 2/2006 | Adair | A61B 1/05 | 348/E7.079 |
| 7,034,902 B2 * | 4/2006 | Tajima | H04N 5/64 | 248/221.11 |
| 7,061,536 B2 * | 6/2006 | Cha | G06F 1/1637 | 348/376 |
| 7,256,987 B2 * | 8/2007 | Weng | G06F 1/1679 | 361/679.55 |
| 7,268,806 B2 * | 9/2007 | Shimizu | G03B 17/48 | 348/221.1 |
| 7,286,181 B2 * | 10/2007 | Cha | G06F 1/1637 | 348/374 |
| 7,526,586 B2 * | 4/2009 | Huber | G06F 1/1632 | 710/72 |
| 7,554,800 B2 * | 6/2009 | Bragg | G06F 1/1632 | 361/679.58 |
| 7,559,026 B2 * | 7/2009 | Girish | H04N 7/142 | 715/716 |
| 7,570,485 B2 * | 8/2009 | Krah | G06F 1/1686 | 345/157 |
| 7,948,752 B2 * | 5/2011 | Tatsukami | G06F 1/1681 | 348/374 |
| 8,166,287 B2 * | 4/2012 | Bear | G06F 1/1605 | 713/1 |
| 8,384,518 B2 * | 2/2013 | Krah | G06F 1/1616 | 340/7.61 |
| 8,711,552 B2 * | 4/2014 | Medica | G06F 1/1632 | 345/473 |
| 8,797,456 B2 * | 8/2014 | Liang | H04N 23/50 | 248/439 |
| 9,047,050 B2 * | 6/2015 | Medica | H04M 1/72409 | |
| 9,256,254 B2 * | 2/2016 | Appleton | G06F 1/1632 | |
| 9,513,667 B2 * | 12/2016 | Pais | G06F 1/1632 | |
| 11,114,065 B1 * | 9/2021 | Corliss | G09G 5/14 | |
| 11,150,690 B2 * | 10/2021 | Franke | G06F 1/1607 | |
| 2002/0044216 A1 * | 4/2002 | Cha | G06F 1/1656 | 348/376 |
| 2005/0014527 A1 * | 1/2005 | Chambers | H04M 1/0264 | 348/E7.079 |
| 2006/0268505 A1 * | 11/2006 | Krah | G06F 1/1679 | 361/679.55 |
| 2010/0010653 A1 * | 1/2010 | Bear | G06F 1/16 | 715/727 |
| 2010/0165169 A1 * | 7/2010 | Bilbrey | H04N 7/142 | 348/E5.022 |
| 2011/0255289 A1 * | 10/2011 | Krah | G06F 1/1686 | 362/253 |
| 2015/0194993 A1 * | 7/2015 | Sajady | H04B 1/3888 | 455/575.1 |
| 2017/0152990 A1 * | 6/2017 | Kielland | G06F 1/1626 | |
| 2019/0250677 A1 * | 8/2019 | Dilaura | H04M 1/0264 | |
| 2021/0136284 A1 * | 5/2021 | Gopalakrishna | H04N 23/75 | |
| 2023/0118441 A1 * | 4/2023 | Kao | H04N 23/695 | 348/207.1 |

\* cited by examiner

FIG. 8

INFORMATION HANDLING SYSTEM DISPLAY PERIPHERAL WITH A DETACHABLE INTEGRATED CAMERA

BACKGROUND OF THE INVENTION

Field of the Invention

The present invention relates in general to the field of information handling system display peripheral, and more particularly to an information handling system display peripheral having a detachable integrated camera.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems process information with processing components disposed in a housing that cooperate to execute instructions. Generally, information handling systems process information for presentation to an end user at a display. Portable information handling systems typically include a display in the housing. Both portable and stationary information handling systems generally present information as visual images at peripheral displays that are separate from the information handling system. For instance, a graphics processor of the information handling system sends pixel values through a display cable to the display to define the visual images. The display often includes a capability for two-way information communication with the information handling system through the cable, such as with a DisplayPort auxiliary channel or a Type-C USB cable. The two-way communication provides control communication, such as managing display settings, and can also support communication of peripheral devices through the display and display cable to the information handling system, such as with a keyboard, mouse and camera interfaced with the display.

One common device associated with peripheral displays is an integrated or peripheral camera. Often cameras are built into the display housing at an upper middle position so that an end user viewing a video conference will look generally at the camera when viewing the display. One example camera offered by Dell's Video Conferencing Monitors has a pop-up function so that the camera retracts into a cavity of the display when not in use and extends out when an end user desires to capture visual images. One difficulty with the use of integrated cameras is that the camera position is fixed relative to the display so that when the end user changes position the end user may not be centered in the camera field of view. An alternative to the integrated camera is to use a peripheral camera separate from the peripheral display, such as a camera that clips onto the display housing or rests on a desktop near the display. The use of a peripheral camera offers greater flexibility to the end user by allowing the camera to be positioned in a variety of viewing positions independent of the display position. A difficulty with the use of a peripheral camera is that the end user has another device to keep track of and interface with the information handling system. In some instances, the peripheral camera might directly connect to the information handling system with a cable or might use a wireless interface to support communications. When the peripheral camera uses an internal battery, the end user also must ensure that adequate battery charge is available before use.

SUMMARY OF THE INVENTION

Therefore, a need has arisen for a system and method which provides an information handling system peripheral display having a detachable integrated camera.

In accordance with the present invention, a system and method are provided which substantially reduce the disadvantages and problems associated with previous methods and systems for including a camera in a display to support operations of an information handling system, such as videoconferencing. A peripheral camera couples in a cavity of a display to extend out and capture visual images that are communicated to an information handling system through the display. The peripheral camera separates from the display cavity for use at exterior positions relative to the display with a camera cable coupled between the camera and display to transfer power and captured visual images. A cable spool in the display manages camera cable extension and retraction so that the peripheral camera remains coupled by the cable to the display in the exterior position.

More specifically, an information handling system processes information with a processor and memory disposed in a housing and interfaced with a peripheral display, such as through a display cable. The peripheral display housing has a cavity that accepts a peripheral camera to capture visual images, such as in support of video conference. The peripheral camera retracts into the cavity in a retracted position when not in use, extends out of the cavity in an extended position to capture visual images while still partially in the cavity, and separates from the display to an exterior position to capture visual images when outside of the display cavity. The peripheral camera couples to a camera cable to remain tethered to the display when in the exterior position and to operate without a battery or wireless communication resource in the peripheral camera housing. One or more feet in a bottom side of the camera hold the camera in a viewing position on a support surface, such as a desktop, when external the display. An adhesive on a rear side of the camera holds the camera on a vertical surface, such as a wall, to offer additional flexibility in capture of visual images from different perspectives.

The present invention provides a number of important technical advantages. One example of an important technical advantage is that a peripheral camera separates from a display to provide convenient placement for the capture of visual images by the camera at positions exterior to the display. The camera cable remains affixed between the display and camera to help prevent the camera from becoming lost, however, the cable may separate with a breakaway connector in the event of application of an excessive force at the camera. The cable provides power and communication for the peripheral camera so that the cost and complexity of the peripheral camera is reduced without including a battery or wireless communication resources. Alternatively, the camera may couple to the cable with a removeable cable and port arrangement, such as USB, so that the camera can operate when not tethered to the display, such as with a camera support that includes a battery and communication resources or a USB interface with an information handling system. The peripheral camera includes extendable feet that extend to hold the camera upright when operating in an exterior position separate from the display and an adhesive rear side that couples to vertical support surfaces, such as a wall.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system peripheral display extends and releases a peripheral camera from an internal cavity that operates separate from the peripheral display by communicating power and information through an extendable and retractable cable coupled between the peripheral camera and the cavity. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
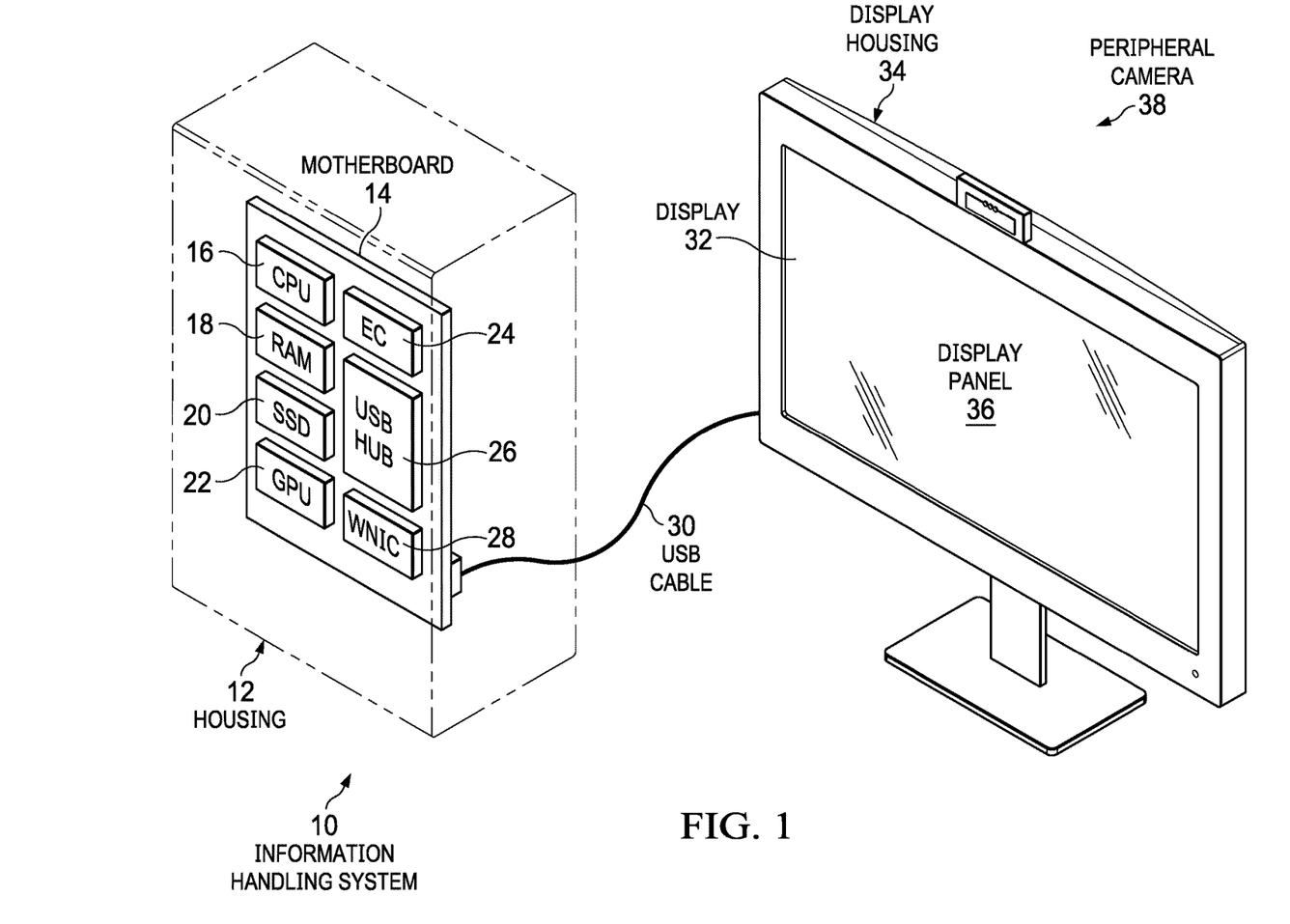
FIG. 1 depicts an information handling system interfaced with a peripheral display having a detachable integrated camera.

Referring now to FIG. 1, an information handling system 10 is depicted interfaced with a peripheral display 32 having a detachable integrated camera 38. In the example embodiment, information handling system 10 is built in a stationary housing 12 to include processing components that process information. For example, a motherboard 14 supports communication between a central processing unit (CPU) 16 that executes instructions to process information and a random access memory (RAM) 18 that stores the instructions and information. A solid state drive (SSD) 20 provides persistent storage of information and instructions, such as an operating system and applications that are retrieved to RAM 18 for execution at system power up. A graphics processing unit (GPU) 22 interfaces with CPU 16 and further processes information to define visual images for presentation at a display, such as with pixel values that are scanned to a display panel. An embedded controller 24 manages operations of the information handling system on a physical level, such as application of power to the processing components, maintenance of thermal constraints of the processing components and interactions with peripheral devices. For instance, embedded controller 24 executes firmware instructions stored in non-transitory memory to manage inputs from peripheral devices, such as a keyboard and mouse, communicated to a USB hub 26. A wireless network interface controller (WNIC) 28 provides wireless communication with external networks and devices, such as through WiFi and/or Bluetooth.

Information handling system 10 provides visual information to display 32 to present visual images, such as by communication pixel values that define colors presented by pixels of a display panel 36. In the example embodiment, a Type C USB cable acts as a display cable 30 that communicates the visual images to display 32 and provides bi-directional communication so that the display can communicate information to USB hub 26. Alternative embodiments may have other types of cables, such as DisplayPort cables. In the example embodiment, display housing 34 holds display panel 36 and has a cavity that holds a peripheral camera 38. Peripheral camera 38 has a retracted position within the cavity of display housing 34 that hides the peripheral camera and also prevents capture of visual images by the peripheral camera. When peripheral camera 38 extends out from display housing 34, a camera module is exposed to capture visual images aligned with the camera field of view, such as in an area in a viewing position of display panel 36. Visual image information captured by peripheral camera 38 is communicated to information handling system 10 through USB cable 30. As is set forth in greater depth below, peripheral camera 38 releases from display housing 34 and, in an exterior position separated from display housing 34, peripheral camera 38 captures visual images from different points of view relative to display 32, thus offering greater flexibility to the end user.

Figure 2:
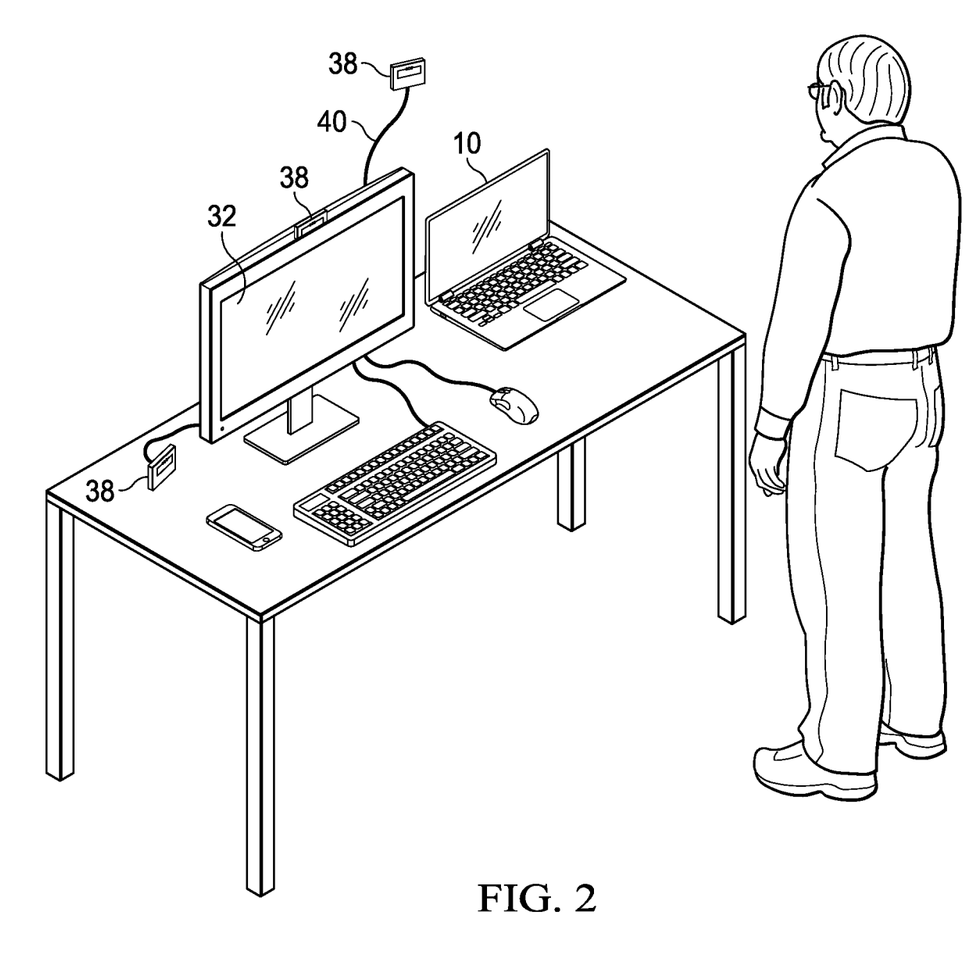
FIG. 2 depicts a variety of examples of positions for the peripheral camera to deploy with the peripheral camera interfaced to the display by a cable extending from within the cavity of display housing.

Referring now to FIG. 2, a variety of examples of positions for peripheral camera 38 are depicted with peripheral camera 38 interfaced to display 32 by a camera cable 40 extending from within the cavity of the display housing. In the example embodiment, information handling system 10 has a portable configuration of a laptop system that presents visual images at display 32. In one example position, peripheral camera 38 has a raised position above display 32 and is coupled to a wall, such as with an adhesive tape or other contact adherent. A camera cable 40 couples between peripheral camera 38 and the interior of display 32 to communicate visual images captured by the camera to display 32 and from display 32 to information handling system 10. In another example position, peripheral camera 38 is removed from the cavity of display 38 to rest on a top side of display 38, thereby adjusting a field of view to different sides of display 32. For instance, peripheral camera 38 rests in a support defined in the upper side of display 32 or clips to the upper side to pan the camera field of view to varied angles. In another example position, peripheral camera 38 rests on a desktop surface with visual information captured by the camera communicated to display 32 through camera cable 40. For instance, peripheral camera 38 has feet that extend from a bottom side and rest on the desktop support surface. The exterior position offers an end user greater flexibility for placement of the camera to achieve a desired field of view. Camera cable 40 tethers the camera to the display to help prevent loss or misplacement of the camera and also to provide power and communication to simplify the camera construction by eliminating a power source and communication logic internally, such as a battery and WNIC. In one example embodiment, camera cable 40 communicates information and power with the Type-C USB configuration, although the cable connection may be provided through a port and connector or through a non-standard fix coupling that keeps the camera tethered to the display as described in greater depth below. In alternative embodiments, camera cable 40 may use alternative configurations to couple the camera to the display with power and information communication support.

Figure 3:
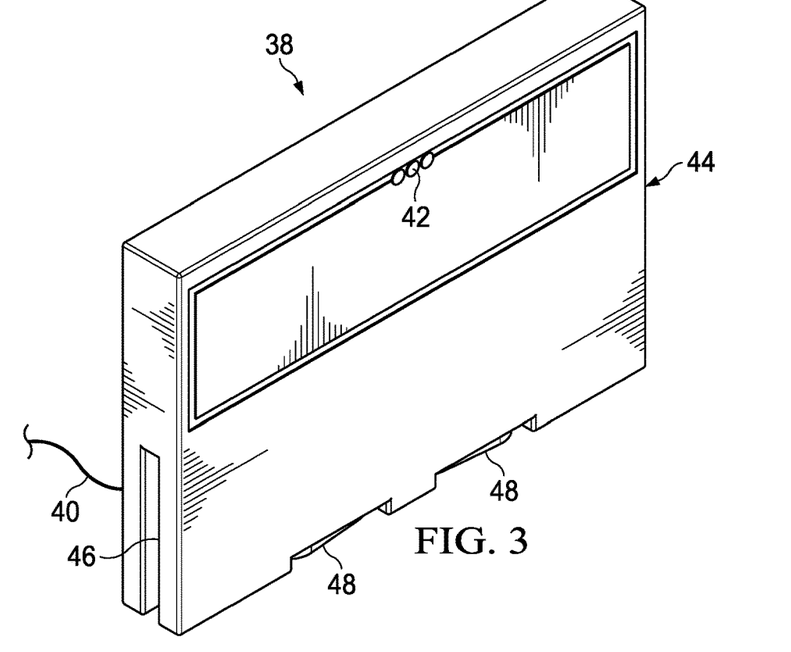
FIG. 3 depicts a front upper perspective view of the camera separate from the display.

Referring now to FIG. 3, a front upper perspective view depicts camera 38 separate from the display. A camera module 42 is built into a camera housing 44 to capture visual images, such as to support a video conference. Camera housing 44 has a thin profile that slides into a cavity that opens at a top side of the display housing. A guide 46 formed in the bottom half of camera 38 slides onto a rail within the display housing cavity to define vertical motion of camera 38 within the cavity. For instance, when peripheral camera 38 fully inserts into the peripheral display housing, the upper side of camera 38 aligns with the upper side of the display housing to blend into the display. A pair of retractable feet 48 fit within the vertical profile of camera 38 to avoid interference with vertical movement of camera 38 within the peripheral display housing cavity. Retractable feet 38 rotate out from the vertical profile of camera housing 44 to extend along a horizontal support plane on which camera 38 rests when exterior to the peripheral display and placed on a support surface.

Figure 4:
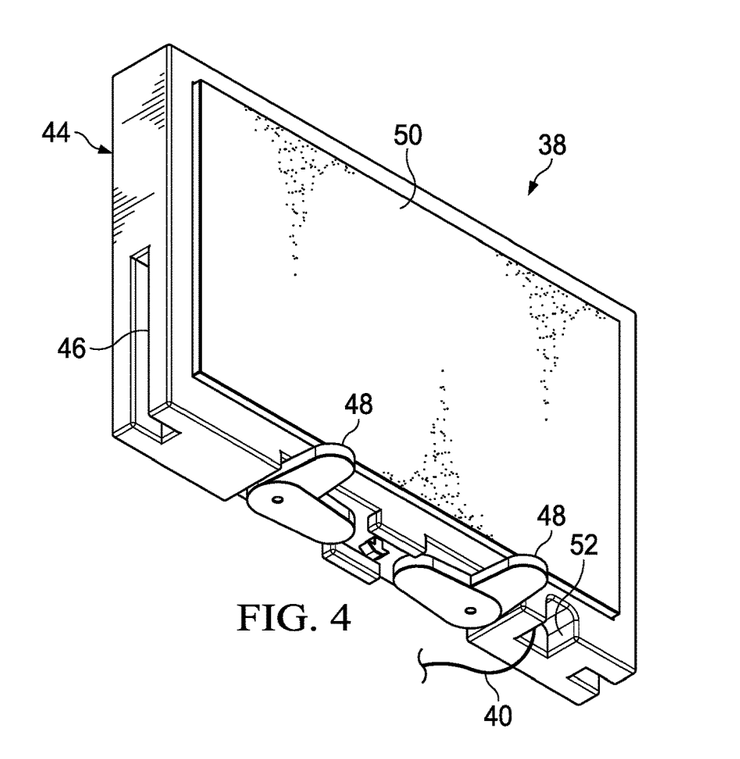
FIG. 4 depicts a bottom rear perspective view of the camera separate from the display and having retractable feet extended to hold the camera erect on a support surface.

Referring now to FIG. 4, a bottom rear perspective view depicts camera 38 separate from the display and having retractable feet 48 extended to hold the camera erect on a support surface. As is described above, guide 46 manages the vertical movement of peripheral camera 38 within the display housing cavity. Retractable feet 48 extend outward to provide a base on which peripheral camera 38 can rest and retract inward to fit into the display housing when the camera transitions from an exterior position to an extended or retracted position within the display housing. A nano tape 50 couples to the rear side of camera housing 44 to offer an adhesive surface so that the camera may be struck to a wall or other structure for use when exterior to the display housing, such as is presented in FIG. 2. A cable connector 52 is located in a recessed portion of camera housing 44 to couple with the camera cable and secure peripheral camera 38 to the peripheral display. For example, cable connector 52 is breakaway connector that affixes peripheral camera 38 to the display but breaks away from the peripheral camera if a sufficient separation force is applied so that the camera and cable do not break. Alternatively, cable connector 52 is a USB Type-C connector port that supports separation of peripheral camera 38 from the cable as part of normal operation and not just in response to excessive force. In the example embodiment, the cost, size and complexity of peripheral camera 38 are reduced by providing power and information transfer through the cable connection so that a battery and logic resources are not needed within peripheral camera 38. For instance, supporting communication through the camera cable reduces cost and complexity by avoiding the use of wireless communication with a WNIC, such as through WiFi or Bluetooth.

Figure 5A:
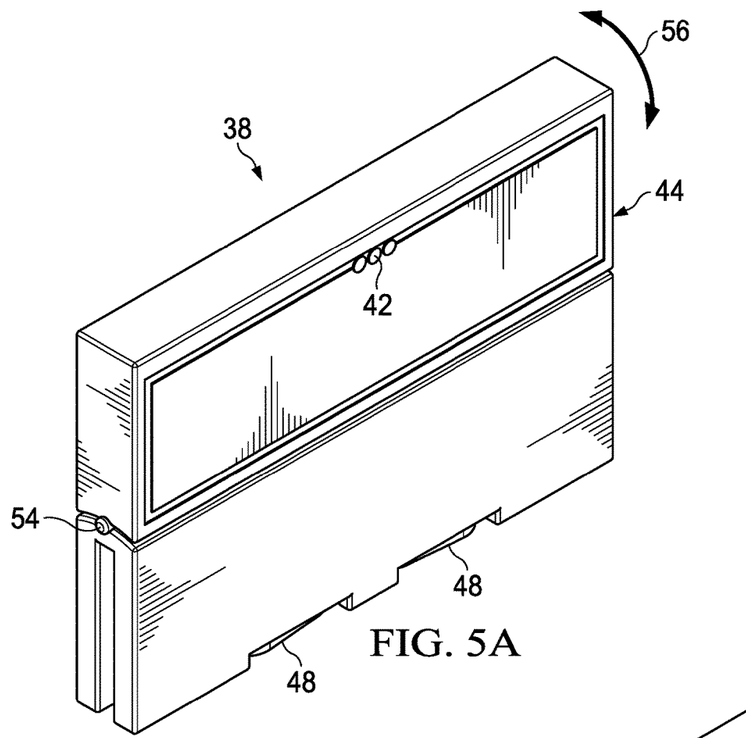
FIGS. 5A and 5B depict an alternative embodiment of the camera having a housing that pivots about a central axis to adjust the camera field of view.
Figure 5B:
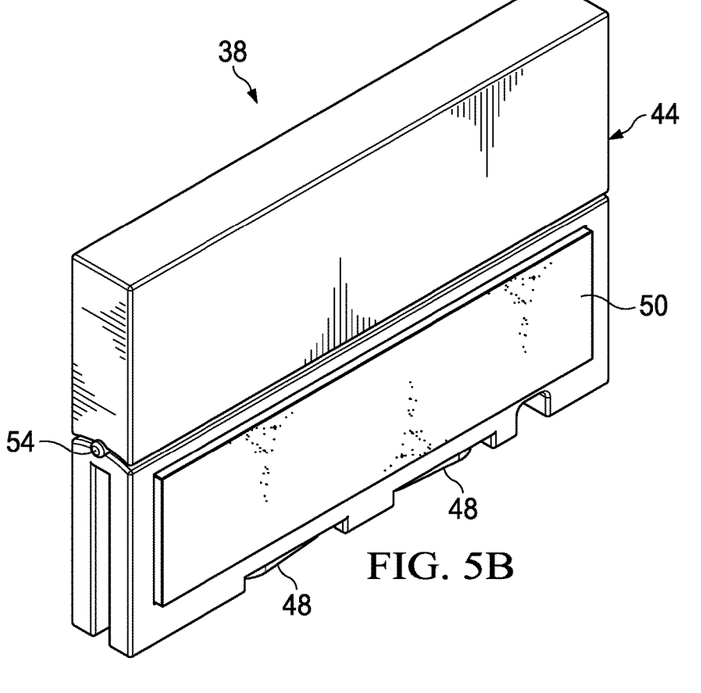

Referring now to FIGS. 5A and 5B, an alternative embodiment of the peripheral camera 38 is depicted having a camera housing 44 that pivots about a central axis 54 to adjust the camera field of view. FIG. 5A depicts a front perspective view of peripheral camera 38 with camera module 42 having a field of view normal the front plane of camera housing 44 to capture visual images. The example embodiment depicts retractable feet 48 as retracted within camera housing 44, such as to have peripheral camera 38 inserted in a display housing cavity, however, peripheral camera 38 may also operate with retractable feet 48 extended to support peripheral camera 38 on a support surface. In either the extended position or the exterior position, camera housing 44 rotates about central axis 54 as indicated by arrow 56 to adjust the camera module 42 field of view. Central axis 54 is, for example, a mechanism that is assembled between the upper and lower portions of camera housing 44. FIG. 5B depicts a rear perspective view of camera 38 to illustrate that adhesive tape 50 on the lower portion of camera housing 44 to support attachment of the camera to a vertical surface, such as a wall. The upper portion of camera housing 44 lacks adhesive tape 50 so that a downward tilt of the camera field of view is supported when the bottom portion of the housing couples to a vertical surface.

Figure 6:
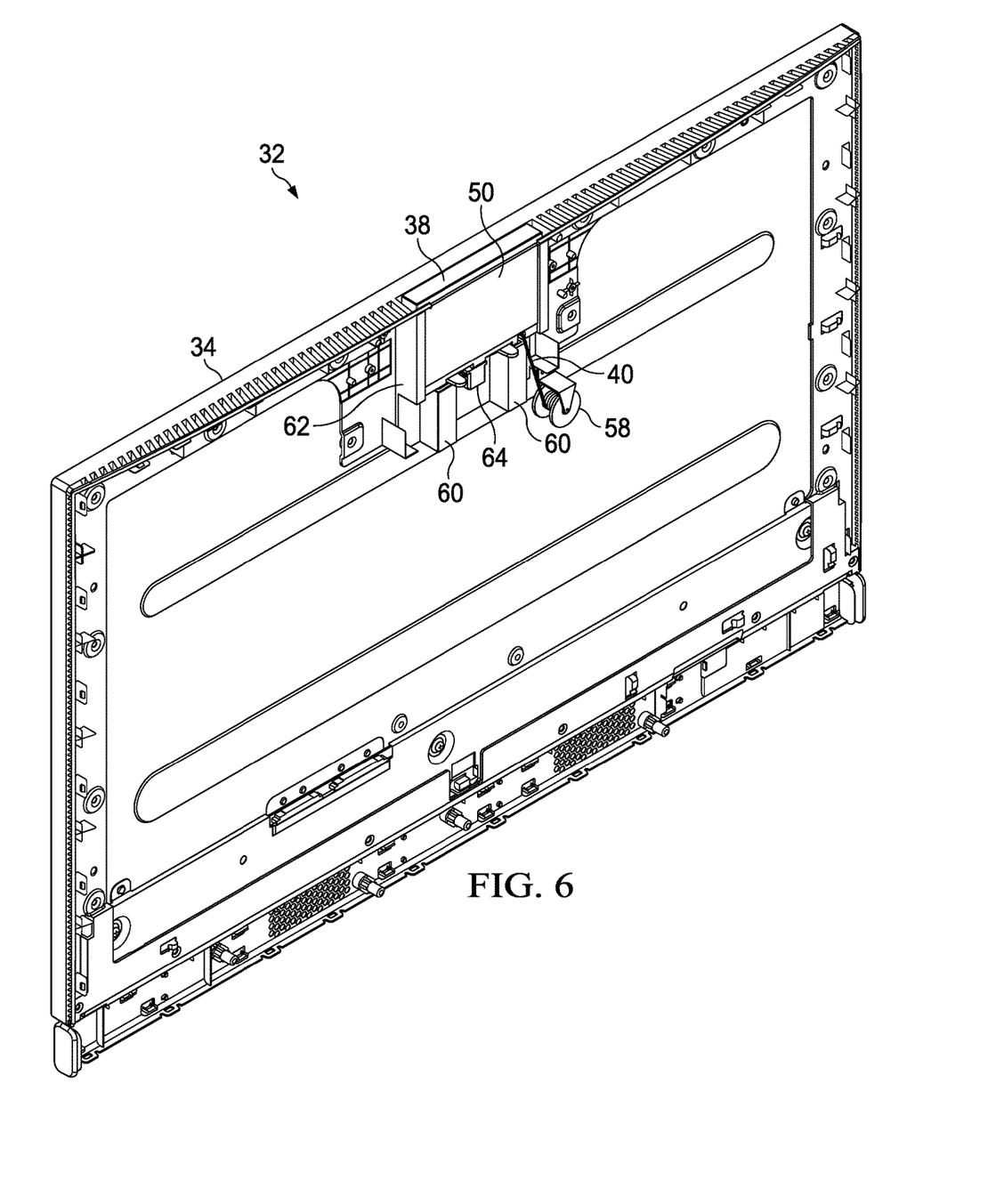
FIG. 6 depicts a rear cutaway view of the display having the camera in a retracted position.

Referring now to FIG. 6, a rear cutaway view depicts display 32 having peripheral camera 38 in a retracted position. Peripheral camera 38 fits into a cavity defined in display housing 34 by engaging guides formed in the sides of the camera housing, as depicted above, with rails 62 coupled in the display housing at the sides of the cavity. Peripheral camera 38 has vertical movement provides by a compression spring disposed within a compression spring chamber 60 to bias the camera upwards and out of display housing 34. A push-push lock 64 couples to the display housing within the cavity to engage a feature at the bottom side of peripheral camera 38. For example, when a push brings the peripheral camera feature into contact with push-push lock 64, the lock engages. When the lock is engaged with the camera feature and a push is made at the camera towards the lock, the lock releases and resets to capture the camera feature at the next push down. A cable spool 58 couples to display housing 34 within the cavity to place a retraction bias on camera cable 40. When peripheral camera 38 extends out of the retracted position, cable spool 58 provides cable out that maintains communication between peripheral camera 38 and display 32. When peripheral camera 38 is returned into the display housing cavity, cable spool 58 retracts camera cable 40. In one example embodiment, camera cable 40 includes a breakaway connector at an end of the cable where it couples to cable spool 58 so that excessive force applied to the cable will release the cable from cable spool 58 and thereby avoid permanent damage. In another alternative embodiment, cable spool 58 couples to display housing 34 in the cavity with a breakaway connector to release the spool in the event of excessive application of force.

Figure 7:
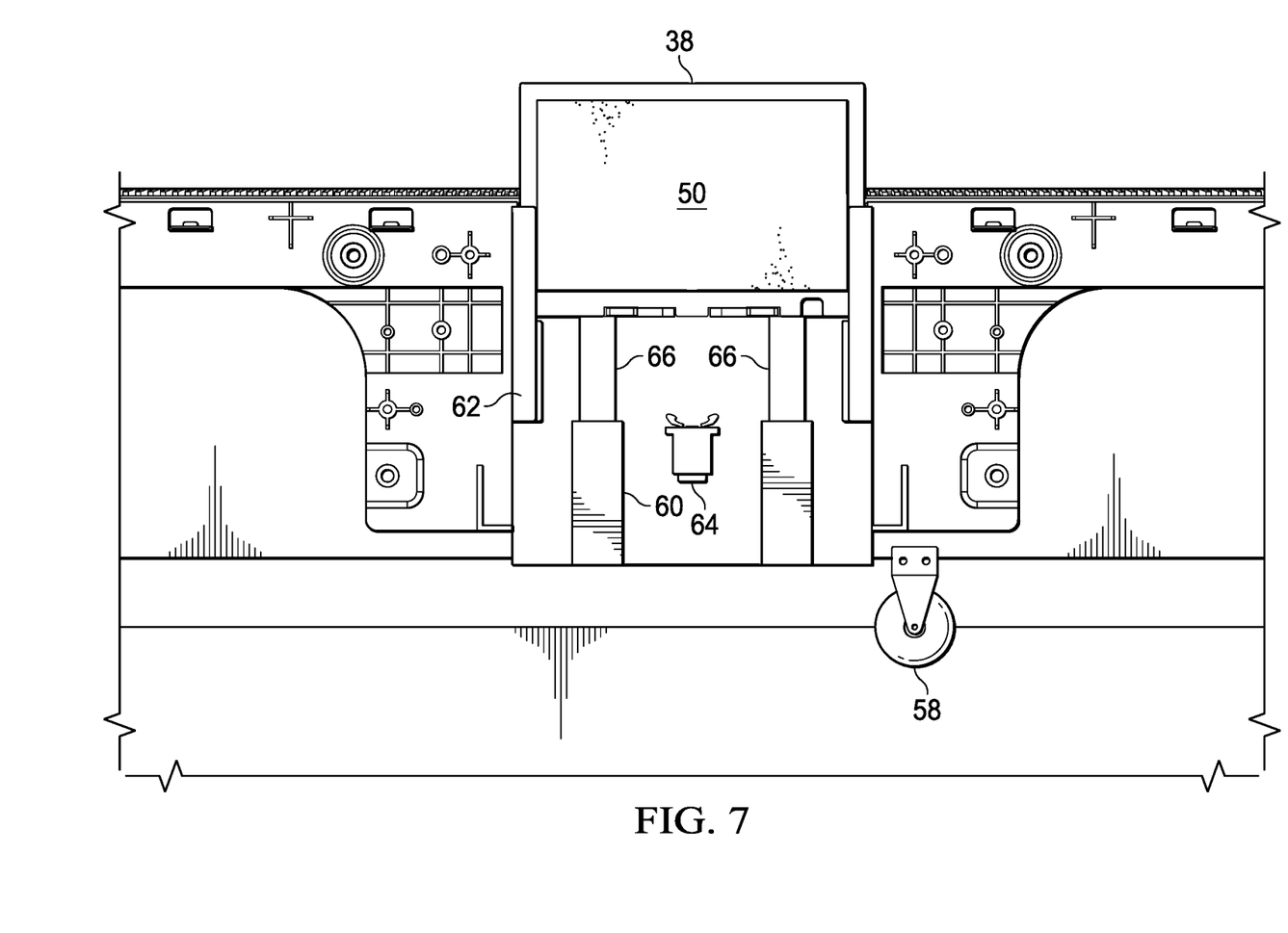
FIG. 7 depicts a rear cutaway view of the display having the camera in an extended position.

Referring now to FIG. 7, a rear cutaway view depicts display 32 having peripheral camera 38 in an extended position. Compression springs 66 in compression spring chamber 60 biases peripheral camera 38 out of the display cavity once lock 64 is released so that the camera module on the front side of peripheral camera 38 is exposed at the front side of display 32. As peripheral camera 38 is raised by compression springs 66 out of display housing 34, cable spool 58 releases camera cable 40 so that peripheral camera 38 remains interfaced with display 32 to communicate power and captured visual images through camera cable 40. Once in the extended position, peripheral camera 38 is sufficiently exposed that an end user can grasp the camera housing and pull the camera out of the display housing in an exterior position with camera cable 40 extending out from cable spool 58. Adhesive tape 50 coupled to the rear side of peripheral camera 38 is available to press camera 38 against a support surface in the exterior position.

Figure 8:
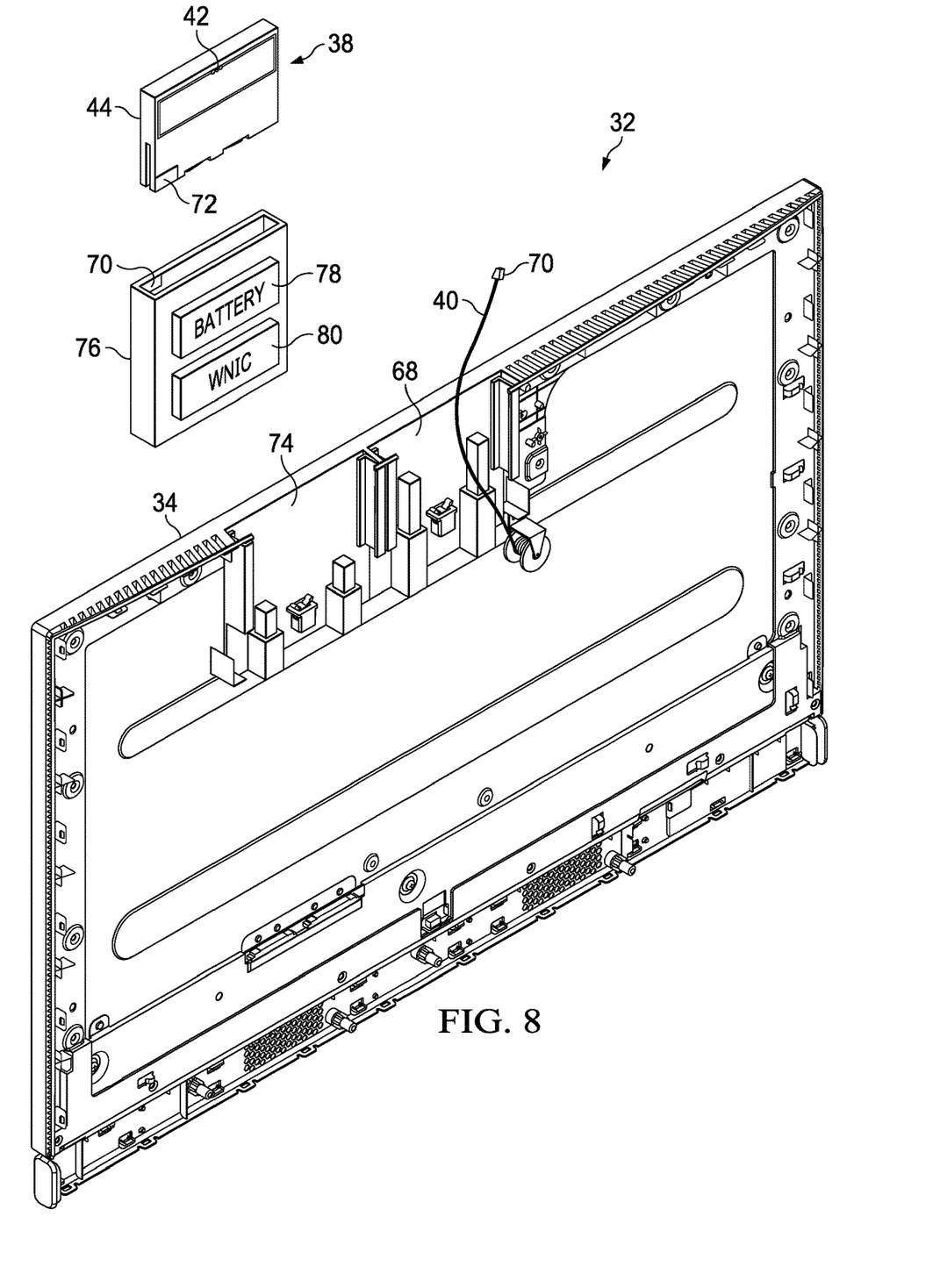
FIG. 8 depicts a camera support that decouples from the display to provide a stand for the camera with battery and wireless communication support.

Referring now to FIG. 8, a camera support 76 is depicted that decouples from the display 32 to provide a stand for peripheral camera 38 with battery 78 and wireless communication support by a WNIC 80. In the example embodiment, a camera support cavity 74 is formed in the top side of display housing 34 near camera cavity 68 and sized to accept camera support 76 so that a connector 70 couples to an interior port within camera support cavity 74 that provides power to charge battery 78. When camera support 76 is removed from camera support cavity 74 and inverted, connector 70 is exposed to contact a port 72 of peripheral camera 58 so that battery power and wireless communication support is provided to peripheral camera 38. Peripheral camera inserts into camera support 76 to be held in a vertical position so that camera module 72 within camera housing 44 is aligned to capture visual images. When an end user completes usage of peripheral camera 38 is the exterior position, peripheral camera 38 is removed from camera support 76 and inserted into camera cavity 68 with connector 70 of camera cable 40 inserted into port 72 so that the camera has power and communication support.

Although the present invention has been described in detail, it should be understood that various changes, substitutions and alterations can be made hereto without departing from the spirit and scope of the invention as defined by the appended claims.

What is claimed is:

1. An information handling system comprising:
  a housing;
  a processor disposed in the housing and operable to execute instructions to process information;
  a memory disposed in the housing and interfaced with the processor, the memory operable to store the instructions and information;
  a graphics processor disposed in the housing and interfaced with the processor, the graphics processor operable to further process the information to define visual images for presentation at a display;
  a peripheral display interfaced with the graphics processor, the peripheral display having a display panel coupled to a display housing, the display panel operable to present the visual images, the display housing having a cavity;
  a peripheral camera inserted in the display housing cavity in a retracted position and extending from the display housing cavity in an extended position, the peripheral camera removeable from the display housing cavity and coupled to the peripheral display by a cable extending out from the display housing cavity, the cable communicating visual image information captured by the peripheral camera to the peripheral display and providing power to the peripheral camera from the peripheral display;
  a camera stand coupled to the display housing and configured to separate from the display housing and accept the peripheral camera when the peripheral camera separates from the peripheral display;
  a battery included in the camera stand and configured to provide power to the peripheral camera; and
  a radio included in the camera stand and configured to provide wireless communication to the peripheral camera.

2. The information handling system of claim 1 further comprising:
  a spool coupled to the peripheral display within the cavity and having the cable wound and unwound when the peripheral camera separates from the display housing cavity and returns to the display housing cavity.

3. The information handling system of claim 2 wherein the cable separates from the peripheral camera at a breakaway connector when a predetermined separation force is applied between the cable and peripheral camera.

4. The information system of claim 2 wherein the cable separates from the spool at a breakaway connector when a predetermined separation force is applied between the cable and peripheral camera.

5. The information handling system of claim 2 wherein the cable couples to the peripheral camera with a USB connector of the cable inserted into a USB port of the peripheral camera.

6. The information handling system of claim 1 wherein the peripheral camera further comprises a foot support configured to fit within a profile of the peripheral camera when retracted in the display housing and to extend from the peripheral camera when removed from the display housing cavity, the foot support holding the peripheral camera in a viewing position when rested on a support surface exterior to the peripheral display.

7. The information handling system of claim 1 further comprising an adhesive coupled to a rear side of the peripheral camera and operable to hold the peripheral camera in a viewing position against a surface exterior to the peripheral display.

8. The information handling system of claim 1 wherein the peripheral camera comprises a camera housing having an upper portion rotationally coupled to a base portion, the upper portion having a camera module and adjusting the camera module field of view by pivoting relative to the base portion.

9. A method for capturing visual images, the method comprising:
- coupling a peripheral camera in a retracted position within an interior of a peripheral display;
- extending the peripheral camera to an extended position at least partially extended from the peripheral display interior to capture visual images;
- removing the peripheral camera to an exterior position outside of the peripheral display to capture visual images;
- communicating power and information between the peripheral camera and peripheral display through a cable coupled to the camera and to the interior of the peripheral display;
- removing a camera stand coupled to the peripheral display; and
- coupling the peripheral camera to the camera stand when the peripheral camera is in the exterior position.

10. The method of claim 9 further comprising:
- engaging the cable in a spool coupled to the peripheral display within the interior;
- extending the cable from the spool when removing the peripheral camera to the exterior position; and
- biasing the cable into the spool when moving the peripheral camera from the exterior position to the interior position.

11. The method of claim 9 further comprising:
- extending one or more feet out of the peripheral camera when in the extended position; and
- capturing visual images with the peripheral camera resting on a support surface and supported by the one or more feet.

12. The method of claim 9 further comprising:
- disposing an adhesive tape on a surface of the peripheral camera; and
- capturing visual images with the peripheral camera in the extend position and coupled to a support surface by the adhesive tape.

13. The method of claim 10 further comprising:
- applying a predetermined force on the cable; and
- in response to the predetermined force, releasing the cable at a breakaway connector.

14. The method of claim 9 further comprising:
- providing power to the peripheral camera from the camera stand; and
- providing wireless communication to the peripheral camera from the camera stand.

15. A peripheral display having a detachable integrated camera, the peripheral display comprising:
- a display housing having a cavity exposed at one side;
- a camera coupled in the cavity, the camera having a camera module operable to capture visual images;
- a cable coupled to the display housing in the cavity and to the camera, the cable communicating power and information between the display housing and the camera, the camera configured to retract into the cavity, to extend from the cavity coupled to the display housing and aligned to capture visual images of a field of view and to remove from the cavity and capture visual images separated from the display housing, the visual images communicated to the display housing through the cable; and
- a camera stand coupled to the display housing and configured to separate from the display housing and accept the camera when the camera separates from the display housing.

16. The peripheral display of claim 15 further comprising a spool coupled to the display housing in the cavity, the cable engaged in the spool to extend the cable when the peripheral camera separates from the display housing and bias the cable back into the spool when the peripheral camera returns into the cavity.

17. The peripheral display of claim 15 further comprising one or more feet coupled to the camera and extending out from a base of the camera when the camera separates from the display housing to support the camera on a support surface.

18. The peripheral display of claim 15 wherein the camera affixes to the cable by a breakaway connector that releases in response to a predetermined force.

* * * * *